United States Patent
Puente Pestaña et al.

(10) Patent No.: US 11,330,333 B2
(45) Date of Patent: May 10, 2022

(54) METHODS OF AND DEVICES FOR ADAPTIVE BIT RATE, ABR, VIDEO RESOLUTION SHAPING OF A VIDEO STREAM IN A TELECOMMUNICATIONS SYSTEM

(71) Applicant: Telefonaktiebolaget LM Ericsson (publ), Stockholm (SE)

(72) Inventors: Miguel Angel Puente Pestaña, Madrid (ES); Franco Foresti, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 17/285,657

(22) PCT Filed: Nov. 28, 2018

(86) PCT No.: PCT/EP2018/082835
§ 371 (c)(1),
(2) Date: Apr. 15, 2021

(87) PCT Pub. No.: WO2020/078575
PCT Pub. Date: Apr. 23, 2020

(65) Prior Publication Data
US 2021/0400347 A1    Dec. 23, 2021

(30) Foreign Application Priority Data
Oct. 19, 2018    (EP) .................................. 18382748

(51) Int. Cl.
*H04N 21/462* (2011.01)
*G06N 20/00* (2019.01)
(Continued)

(52) U.S. Cl.
CPC ......... *H04N 21/4621* (2013.01); *G06N 20/00* (2019.01); *H04L 47/25* (2013.01);
(Continued)

(58) Field of Classification Search
CPC .......... H04N 21/4621; H04N 21/4402; H04N 21/4662; G06N 20/00; H04L 47/25; H04L 65/80
See application file for complete search history.

(56) References Cited

U.S. PATENT DOCUMENTS

2013/0332620 A1* 12/2013 Gahm ................ H04N 21/6332
709/231
2014/0181266 A1    6/2014 Joch et al.
(Continued)

FOREIGN PATENT DOCUMENTS

EP         3142368 A1    3/2017

OTHER PUBLICATIONS

Xing et al., "A Real-Time Adaptive Algorithm for Video Streaming over Multiple Wireless Access Networks", Apr. 2014, IEEE Journal on Selected Areas in Communications, vol. 32, No. 4 (Year: 2014).*
(Continued)

*Primary Examiner* — Gims S Philippe
*Assistant Examiner* — Alexander Boyd
(74) *Attorney, Agent, or Firm* — Christopher & Weisberg. P.A.

(57) ABSTRACT

A method of supporting Adaptive Bit Rate, ABR, video resolution shaping of a video data stream of a video session transferred by a User Plane Function, UPF, in a Service Based Architecture, SBA, domain. The video resolution shaping is performed by the UPF implementing a Reinforcement Learning Agent, RLA, operating with an observation space having a determined video resolution of a received video data stream, a reward space having a reward referring to a required video resolution, and an action space having video resolution shaping levels to be applied at the received video data stream. Complementary methods and devices for performing such a method in an SBA domain deployed in a telecommunications system are disclosed.

4 Claims, 4 Drawing Sheets

(51) Int. Cl.
*H04L 47/25* (2022.01)
*H04L 65/80* (2022.01)
*H04N 21/4402* (2011.01)
*H04N 21/466* (2011.01)

(52) U.S. Cl.
CPC ......... *H04L 65/80* (2013.01); *H04N 21/4402* (2013.01); *H04N 21/4662* (2013.01)

(56) References Cited

U.S. PATENT DOCUMENTS

| | | | | |
|---|---|---|---|---|
| 2018/0014050 | A1* | 1/2018 | Phillips | H04N 21/26258 |
| 2019/0246182 | A1* | 8/2019 | Galecki | H04N 21/64738 |
| 2020/0099733 | A1* | 3/2020 | Chu | H04N 21/2662 |
| 2021/0409789 | A1* | 12/2021 | Han | H04N 21/23439 |

OTHER PUBLICATIONS

Huang et al., "QARC: Video Quality Aware Rate Control for Real-Time Video Streaming based on Deep Reinforcement Learning", Version 1 submitted to arXiv at arXiv.org on May 7, 2018 (Year: 2018).*

Qiu et al., "Dynamic Adaptive Streaming Control based on Deep Reinforcement Learning in Named Data Networking", added to IEEE at ieeexplore.ieee.org on Oct. 8, 2018 (Year: 2018).*

International Search Report and Written Opinion dated Apr. 12, 2019 for International Application No. PCT/EP2018/082835 filed on Nov. 28, 2018, consisting of 19-pages.

Applying Adaptive Traffic management: Improving Network Capacity and the Subscriber Experience; Applying Adaptive Traffic Management/White paper; Aug. 1, 2013, consisting of 18-pages.

Hyunwoo Nam et al.; Towards Dynamic QoS-aware Over-The-Top Video Streaming; Department of Computer Science, Columbia University, Proceeding of IEEE International Symposium on a World of Wireless, Mobile and Multimedia Networks, Jun. 19, 2014, consisting of 10-pages.

3GPP TS 23.501 V15.2.0; 3rd Generation Partnership Project: Technical Specification Group Services and System Aspects; System Architecture for the 5G System; Stage 2 (Release 15), Jun. 2018, consisting of 217-pages.

3GPP TS 29.244 V15.3.0; 3rd Generation Partnership Project: Technical Specification Group Core Network and Terminals; Interface between the Control Plane and the User Plane Nodes; Stage 3 (Release 15), Sep. 2018, consisting of 189-pages.

* cited by examiner

METHODS OF AND DEVICES FOR ADAPTIVE BIT RATE, ABR, VIDEO RESOLUTION SHAPING OF A VIDEO STREAM IN A TELECOMMUNICATIONS SYSTEM

CROSS-REFERENCE TO RELATED APPLICATIONS

This application is a Submission Under 35 U.S.C. § 371 for U.S. National Stage Patent Application of International Application No.: PCT/EP2018/082835, filed Nov. 28, 2018 entitled "METHODS OF AND DEVICES FOR ADAPTIVE BIT RATE, ABR, VIDEO RESOLUTION SHAPING OF A VIDEO STREAM IN A TELECOMMUNICATIONS SYSTEM," which claims priority to European Application No.: 18382748.4, filed Oct. 19, 2018, the entireties of both of which are incorporated herein by reference.

TECHNICAL FIELD

The present disclosure generally relates to the field of video streaming and, more specifically, to Adaptive Bit Rate, ABR, video resolution shaping of a video stream in a Service Based Architecture, SBA, domain in a core network of a telecommunications system, such as a Fifth Generation, 5G, telecommunications system.

BACKGROUND

The Fifth Generation, 5G, telecommunications core network architecture is an example of a Service Based Architecture, SBA, in which Network Functions, NF, provide one or multiple services to entities requiring telecommunications services from a particular NF. In turn, an NF may also request telecommunications services from another NF, for example. The NFs of the Core Network, CN, are self-contained functionalities that can be modified and updated in an isolated manner, i.e. without affecting other NFs.

Control and User Plane Separation, CUPS, enables a flexible placement of the separated control plane and user plane functions for supporting diverse deployment scenarios, such as a central or distributed user plane function.

In the Fifth Generation telecommunication network, 5G, CUPS refers to Session Management Function, SMF, and User Plane Function, UPF, network functions, and to the N4 reference point between SMF and UPF, which is based on Packet Forwarding Control Protocol, PFCP.

The SMF controls the packet processing in the UPF by establishing, modifying or deleting PFCP session contexts and by adding, modifying or deleting Packet Detection Rules, PDRs, Forwarding Action Rules, FARs, Quality of service Enforcement Rules, QERs, Usage Reporting Rules, URRs, and/or Buffering Action Rule, BAR, per PFCP session context, whereby an PFCP session context may correspond to an individual Protocol Data Unit, PDU, session or a standalone PFCP session, not tied to any PDU session.

Following the packet forwarding model disclosed in the Third Generation Partnership Project, 3GPP, standard 29.244, "Interface between the Control Plane and the User Plane nodes", the contents of which are included herein by reference, each PDR contains Packet Data Information, PDI, that are one or more match fields against which incoming packets are matched, and may be associated with the following rules providing a set of instructions to apply to packets matching the PDI:

one FAR, which contains instructions related to the processing of the packets, specifically forward, duplicate, drop or buffer the packet with or without notifying the Control Plane, CP, function about the arrival of a DL packet;

zero, one, or more QERs, which contain instructions related to the QoS enforcement of the traffic;

zero, one, or more URRs, which contain instructions related to traffic measurement and reporting.

Adaptive Bit Rate, ABR, streaming protocols such as Apple® Hypertext Transfer Protocol, HTTP, live stream, HLS, Microsoft® Smooth Streaming, MSS, Adobe® HTTP Dynamic Streaming, HDS, or Dynamic Adaptive Streaming over HTTP, DASH, comprise the latest generation of video streaming protocols. They natively support delivery optimization techniques that are handled by the end points, i.e. User Equipment, UE, and video servers. Although the several ABR protocols have some differences, they have the following characteristics in common:

Media streams are encoded beforehand, so that several versions, with different encodings, of the same video can exist and are referenced by the so called "descriptor file", each version with its corresponding identifier/locator, such as a Uniform Resource Locator, URL.

Each of the video versions is partitioned in so called "chunks" or "segments", i.e. portions of the video data of a certain duration in seconds. The available chunks are also described in the descriptor file, so that the UE can make requests for specific chunks along with the above-mentioned quality identifier.

Before the actual video delivery takes place, the video server sends to the UE the "descriptor file" defining the characteristics such as the format, encoding, duration and listing of different qualities/characteristics in which the video is available, identified by different descriptors/locators, for example different URLs.

The UE parses the descriptor file and selects video quality/characteristics, i.e. format, encoding, etc. among those present in the descriptor file, based on the network conditions as perceived by the UE and terminal characteristics.

The UE then requests video chunks by means of HTTPS GET messages, which may possibly be encrypted, using the appropriate URL indicating the video quality and the specific chunks the UE wants to fetch. The UE stores and reproduces the received chunks from a local buffer.

The video quality can also be dynamically reselected during a video session, using different URLs in the HTTPS GET messages. In this way, video quality can degrade gracefully when the terminal UE cannot keep up with higher bitrates for any reason such as when, for example, the transmission resources of the network are overloaded and cannot provide enough bandwidth to the UE, and/or the processing or playing resources of the UE are overloaded.

ABR shaping is a technique to control the quality of an ABR video flow or video data stream. It is based on forcing a certain bit rate or "shaping level", for example by means of throttling mechanisms, to the ABR video traffic, which causes the video client, i.e. the UE, to switch the video resolution to meet the imposed bit rates.

There is no direct relation between bit rates and the video resolutions since different codecs can be used, and different parts of the videos require disparate bit rates. Besides, each video application may implement its own resolution selection algorithms, based on the network conditions observed.

A typical ABR shaping implementation consists of the following modules.

A resolution estimation or prediction module, that estimates the resolution of a video session. A video is divided into chunks that correspond to a portion of the video of a certain duration (around 10 sec). The resolution estimation is provided for each chunk. Resolution levels can be measured, for example, in low/med/high categories, 240p/360p/480p, where p denotes progressive scan and the number denotes the number of pixels. The resolution estimation module requires a certain number of subsequent chunks to estimate the resolution of a video stream with acceptable accuracy. If there are not enough chunks available, no estimation is provided.

A shaping level decision module, that decides about the shaping level to apply to the video data stream of a video session. This module takes the resolution estimation provided by the resolution estimation module. A shaping level is a maximum bit rate value. The shaping level to apply depends on the required or wanted resolution for the video session and the resolution estimation. The required resolution value is statically configured on a per user basis.

A default shaping level is applied when no estimation is provided by the resolution estimation module, i.e. when there are not enough video chunks to estimate the resolution, for example. For each possible wanted resolution option, a default shaping level is statically preconfigured.

A shaping enforcement module, to apply or enforce the decided shaping level. This module takes the shaping level decided by the shaping level decision module, and applies the shaping level to the video data stream of the video session.

The known ABR shaping solution entails the following problems:

The resolution estimation module needs several video chunks (for example around 3-5 chunks) to provide an accurate estimation of the video resolution of a received video data stream. During this time, default shaping level is applied.

The default shaping level is statically configured. Its value is intended to force the required resolution. However, the network and video traffic characteristics change, such that the static value may be outdated and may be forcing a different resolution than required.

The video resolution is selected by the video application in the UE. However, it is not certain that all the video applications implement the same resolution selection algorithms, different versions of the same video application may implement different algorithms. Accordingly, different resolutions can be selected by different video applications under the same network conditions, which makes a static default shaping level a non-optimal solution.

For a certain video resolution, the video chunks can be encoded using different video codecs. Each codec entails a different bit rate. Using a default shaping level per wanted resolution and static heuristic algorithms for the shaping level decision are therefore non-optimal approaches, since they cannot adapt to video traffic that uses different codecs.

The value of the default shaping level may be obtained, for example, by means of laboratory tests, based on historical data or video captures, etc. To check if this value is still valid and up-to-date, the same process has to be repeated, which is slow and costly.

The video resolution may change during the first chunks of the video. The new video chunks are sent through a new video flow, which causes the previous chunks to be discarded. If this occurs, more video chunks are needed to estimate the video resolution, and the effects of a wrong default shaping level would be more pronounced.

Only when the resolution estimation or prediction module has processed enough chunks and estimated the video resolution, the shaping level decision module is able to correct the shaping level in case the resolution of a transferred video data stream of a video session has not the wanted resolution. It is noted that, although the default shaping level was provoking a wrong video resolution, this default value is maintained.

The shaping level decision module is based on heuristic algorithms, which lead to non-optimal decisions. Some of them face convergence issues as well. For example, an algorithm that increases/decreases the shaping level by a constant delta and observes the results, may take a long time until the wanted resolution is achieved.

SUMMARY

The present disclosure has for its object to implement improved Adaptive Bit Rate, ABR, shaping support of a video stream in a Service Based Architecture, SBA, domain in a core network of a telecommunications system, and more particular to provide an autonomous solution to adapt changing network and video characteristics for individual users.

In a first aspect of the present disclosure, there is presented a method of supporting Adaptive Bit Rate, ABR, video resolution shaping of a video data stream of a video session transferred by a User Plane Function, UPF, in a Service Based Architecture, SBA, domain deployed in a telecommunications system.

The method comprises the steps of determining, by the UPF, a video resolution of a video data stream received by the UPF; establishing, by the UPF, based on the determined video resolution, a required video resolution and a Maximum Bit Rate, MBR, of the video session, a video resolution shaping level to be applied at the received video data stream, for achieving the required video resolution of the video session; applying, by the UPF, the video resolution shaping on the received video data stream, and transferring, by the UPF, the received video data stream at which the video resolution shaping is applied.

The step of establishing the video resolution shaping is performed by the UPF implementing a Reinforcement Learning Agent, RLA, operating with an observation space comprising the determined video resolution, a reward space comprising a reward referring to the required video resolution, and an action space comprising video resolution shaping levels to be applied at the received video data stream.

Reinforcement learning is a type of machine learning where an RLA learns how to behave in an environment by performing actions and observing the results. When performing an action, the RLA receives a reward, which indicates whether the environment is in a desirable state or not. The RLA executes algorithms that learn to take actions that maximize a cumulative reward in the long term.

In machine learning, the environment is typically modeled as a Markov Decision Process, MDP. MDP uses a finite set of states and a finite set of actions that lead to state changes. A reinforcement learning agent interacts with its environment in discrete time steps. At each time step, the environment is in some State (St) and sends an observation of this state along with a current Reward (Rt) to the RLA. Then the RLA may choose an Action (At) that is available in that state. Then the environment responds at the next time step by moving into a new state (St+1) and giving the agent a corresponding reward (Rt+1), etc.

All the possible actions the RLA can take is named "action space", and all the possible states of the environment is named "observation space". Iterating over this process and observing the rewards, the RLA learns optimal policies that map states to actions in such a way that the cumulative reward of the actions gets maximized.

In operation the RLA switches between two modes and will find a balance between them: exploration (of uncharted territory) and exploitation (of current knowledge):

Exploration—The RLA takes actions that do not follow the optimal policies. For example, selecting actions randomly, using heuristic algorithms, or using more complex and optimized methods such as epsilon-greedy.

Exploitation—The RLA takes actions according to the optimal policies that have been learned during the exploration phase.

The RLA may have full observability of the whole environmental state or may have partial observability of the environment state. This means that different RLAs acting over the same environment may receive different state information from it.

By applying RLA in the UPF of an SBA domain in a core network of a telecommunications system, an improved and autonomous solution is provided to adapt the video resolution of a data stream of a video session transferred by the UPF from a source of video data to a user of the video data, such as a User Equipment, UE, or client server, in support of ABR streaming protocols. In particular, the present disclosure provides for ABR support in changing network and video characteristics for individual users.

The disclosed solution avoids the need for a statically configured default shaping level for a given wanted resolution. Instead, the RLA is able to learn the optimal policies that map the different shaping levels to the required or wanted video resolution and the determined resolution of a video data stream of a respective video session. The solution is applicable to operate with multiple UPF in an SBA domain and allows to adapt to changing network and video traffic characteristics for each individual UPF.

The RLA agent continuously, autonomously learns the optimal policies for the shaping level decisions, such that no human intervention is needed. The solution may also work for encrypted video traffic.

According to an embodiment of the present disclosure, the video resolution of the received video data stream is determined, by the UPF, by computing a video resolution state of a video chunk of the received video data stream and an associated reward based on the computed video resolution state and the required video resolution.

In an exemplary embodiment, the reward is computed, by the UPF, additionally based on at least one of overall network load, an estimation of Quality of Experience, QoE, of the video session, video session throughput at the UPF, estimated resolutions of previous video chunks, and network transmission parameters.

The video resolution state and the associated reward may be computed, by an implementation of the RLA, on a chunk by chunk basis. If no video resolution can be computed, an "unestimated" resolution state may be applied, for example.

In an embodiment of the present disclosure, a video resolution shaping level is applied, by the UPF, selected by the RLA from the action space based on the video resolution state, the associated reward, and a level of operation of the RLA, the video resolution shaping level comprising a bit rate of the video data stream to be transferred by the UPF. The level of operation of the RLA comprises, among others, the policies learned by the RLA, whether same is in exploration or exploitation mode, and the set of possible actions, i.e. the size of the level shaping action space.

Those skilled in the art will appreciate that the RLA, in the present disclosure, may apply multiple commercially available algorithms for estimating video resolution, reward computation, and for deriving shaping levels. The choice of algorithm is a mere implementation aspect, and does not form part of the present disclosure. Further, a UPF may comprise a plurality of RLA, operating with the same or mutually different processing algorithms, for example.

For operating the UPF in accordance with the present disclosure in an SBA domain comprising a Session Management Function, SMF, the UPF associates with the SMF by transmitting, to the SMF, a Packet Forwarding Control Protocol, PFCP, Association Setup Response message indicating that the UPS supports RLA based ABR video resolution shaping.

The UPF receives, from the SMF, a Packet Forwarding Control Protocol, PFCP, Association Setup Response message comprising Control Plane, CP, features including RLA based ABR video resolution shaping supported by the SMF.

In a further embodiment, when a user establishes a Protocol Data Unit, PDU, video session, that is an association between a UE and a data network for exchanging a video data stream, the UPF receives, from the SMF, a PFCP Session Establishment Request message comprising a Packet Detection Rule, PDR, providing data packet matching rules of a video data stream of a video session to be transferred by the UPF applying RLA based ABR video resolution shaping, the PDR comprising a video application identifier, video application-ID, and a corresponding Quality of Service, QoS, Enforcement Rule, QER, comprising a required video resolution and an MBR of the video session, and wherein the UPF transmits a PCFP Session Establishment Response message to the SMF.

That is, in this implementation, the SMF selects a UPF supporting the RLA based ABR shaping feature. The SMF conveys the requested or wanted resolution and MBR to the UPF as part of the N4 session establishment procedure within a QER. The wanted or requested solution may include a categorical value such as 240p/480p/1080p/ . . . , for example.

In the case of an update of or modification in a continuing session, in an embodiment of the present disclosure, in line with session establishment, the UPF receives, from the SMF, a PFCP Session Establishment Modification message comprising a PDR providing a modified QER, comprising a required video resolution and MBR of the video session.

In an embodiment, the method further comprises the steps of receiving, by the UPF, a video data stream of a video session to be transferred by the UPF, the video data stream comprising a video application ID; determining, by the UPF, based on the video application ID, that RLA based ABR video resolution shaping has to be applied at the received video data stream; determining, by the UPF, that a first data packet of the video data stream of the video session is received, and generating and storing a video session identifier, video session-ID, for the video session in relation to the video application-ID; establishing, by the RLA of the UPF, the video resolution shaping for the video session based on the video session-ID, and wherein if the UPF comprises a plurality of RLA each operative for a different QER, the video session-ID is mapped to a respective RLA.

The video application-ID identifies a particular video application, which may also relate to a particular video data source or provider, for example, and whether RLA based ABR is to be applied by the UPF in transferring the particular video data stream. Based on a received first data packet of the respective video data stream, a video session- ID is generated, by the UPF, among others for operating the RLA with the applicable settings for the video session and for mapping the video session to a particular RLA of the UPF, if applicable.

In a second aspect of the present disclosure, there is presented a method of supporting Adaptive Bit Rate, ABR, video resolution shaping of a video data stream of a video session transferred by a User Plane Function, UPF, in a Service Based Architecture, SBA, domain deployed in a telecommunications system, from the perspective of a Session Management Function, SMF, comprised by the SBA domain.

The method according to the second aspect of the present disclosure comprises the steps of receiving, by the SMF, a Packet Forwarding Control Protocol, PFCP, Association Setup Response message from the UPF, indicating that the UPF supports Reinforcement Learning Agent, RLA, based ABR video resolution shaping, and transmitting, by the SMF, to the UPF, a Packet Forwarding Control Protocol, PFCP, Association Setup Response message comprising Control Plane, CP, features including RLA based ABR video resolution shaping supported by the SMF.

With this method, the or each UPF and SMF in an SBA domain are associated, indicating that a UPF supports RLA based ABR video resolution shaping in accordance with the present disclosure.

According to an embodiment, wherein the SBA domain further comprises an Access and Mobility Management Function, AMF, and a Policy Control Function, PCF, and the method further comprises the steps of receiving, by the SMF, a video session establishment request message from the AMF, the message including a user identifier, user-ID; querying, by the SMF, the PCF for Policy and Charging Control, PCC, rules relating to the user-ID; receiving, by the SMF, in reply to the querying, a PCC rule comprising a video application identifier, video application-ID, and a corresponding Quality of Service, QoS, Enforcement Rule, QER, comprising a required video resolution and an MBR of the video session; selecting, by the SMF, based on the received PCC rule, a UPF supporting RLA based ABR video resolution shaping, for transferring a video data stream of the video session; transmitting, by the SMF, to the selected UPF, a PFCP Session Establishment Request message comprising a Packet Detection Rule, PDR, providing data packet matching rules of the video data stream of the video session to be transferred by the UPF applying RLA based ABR video resolution shaping, the PDR comprising the video application-ID, and corresponding QER of the video session, and receiving, by the SMF, a PCFP Session Establishment Response message from the UPF.

When a user establishes a PDU session, the PCF provides the required or wanted resolution and an MBR as part of the PCC rules. The SMF selects a UPF supporting the RLA ABR shaping feature and the SMF conveys the wanted resolution and MBR to the selected UPF as part of the N4 session establishment procedure within a QER.

In a third aspect of the present disclosure, there is presented a method of supporting Adaptive Bit Rate, ABR, video resolution shaping of a video data stream of a video session transferred by a User Plane Function, UPF, in a Service Based Architecture, SBA, domain deployed in a telecommunications system, wherein the SBA domain further comprises a Policy Control Function, PCF, and Session Management Function, SMF.

The method according to the third aspect comprises, viewed from the perspective of the PCF, the steps of receiving, by the PCF, a query of the SMF for Policy and Charging Control, PCC, rules relating to a user-ID; transmitting, by the PCF, in reply to the query, a PCC rule comprising a video application identifier, video application-ID, and a corresponding Quality of Service, QoS, Enforcement Rule, QER, comprising a required video resolution and an MBR of the video session for supporting Reinforcement Learning Agent, RLA, based ABR video resolution shaping by the UPF.

In a fourth aspect of the present disclosure, there is presented a User Plane Function, UPF, in a Service Based Architecture, SBA, domain deployed in a telecommunications system, the UPF implementing a Reinforcement Learning Agent, RLA, operating with an observation space, a reward space, and an action space comprising video resolution shaping levels to be applied at the received video data stream supporting Adaptive Bit Rate, ABR, video resolution shaping of a video data stream of a video session to be transferred by the UPF, in accordance with any of the embodiments presented in the first three aspects of the present disclosure.

According to an embodiment of the fourth aspect of the present disclosure, the UPF comprises a resolution estimation module, arranged for determining a video resolution of video chunks of a video data stream received by the UPF, a shaping level decision module, arranged for establishing a video resolution shaping level to be applied at the received video data stream, based on the determined video resolution, a required video resolution and an MBR, of the video session, for achieving the required video resolution of the video session, and a shaping enforcement module, arranged for applying the established video resolution shaping level on the received video data stream for transfer by the UPF, wherein the observation space and the reward space of the RLA operate in conjunction with the resolution estimation module, and the action space operates in conjunction with the shaping level decision module.

In a fifth aspect of the present disclosure, there is presented a Service Based Architecture, SBA, domain deployed in a telecommunications system, comprising a User Plane Function, UPF, in accordance with the fourth aspect of the present disclosure, and at least one of a Session Management Function, SMF, and a Policy Control Function, PCF, arranged for operating in accordance with the various embodiments presented herein.

In a sixth aspect of the present disclosure, computer program products are provided, comprising a computer readable storage medium, storing instructions which, when executed on at least one processor operative in one of a UPF, SMF, PCF of an SBA domain, cause the at least one processor to carry out processing steps for performing the steps disclosed in a respective one of the method according to the first, second and third aspect of the present disclosure.

It will be appreciated that the entities and modules disclosed may be implemented as separate hardware and/or software modules and entities, and controlled by or executed in a processor or the like.

The above mentioned and other features and advantages of the disclosure will be best understood from the following description referring to the attached drawings. In the drawings, like reference numerals denote identical parts or parts performing an identical or comparable function or operation.

DETAILED DESCRIPTION

Embodiments contemplated by the present disclosure will now be described more in detail with reference to the accompanying drawings. Other embodiments, however, are contained within the scope of the subject matter disclosed herein. The disclosed subject matter should not be construed as limited to only the embodiments set forth herein; rather, the illustrated embodiments are provided by way of example to convey the scope of the subject matter to those skilled in the art.

Figure 1:
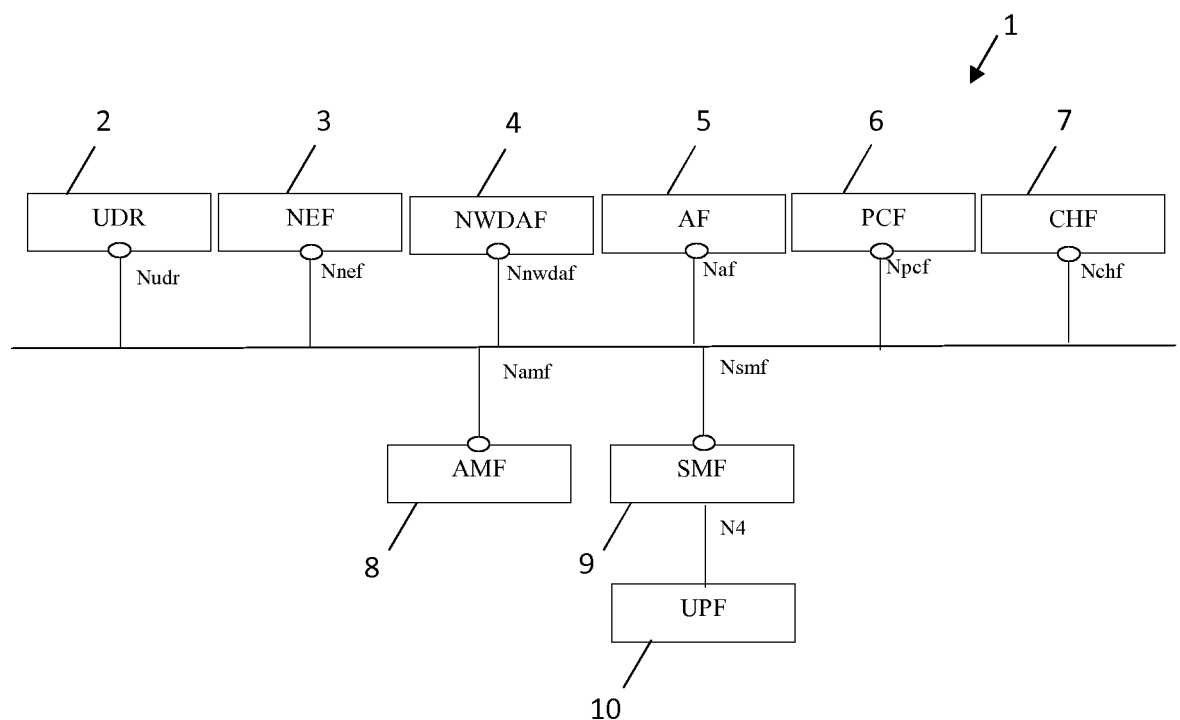
FIG. 1 schematically illustrates a part of a reference architecture of a Fifth generation, 5G, telecommunication systems according to the prior art.

FIG. 1 schematically illustrates part of the reference architecture 1 of a fifth generation, 5G, Service Based Architecture, SBA, telecommunication network, according to the prior art. The 5G system architecture comprise the following Network Functions, NFs:

Access and Mobility Management Function, AMF, 8
Network Exposure Function, NEF, 3
Policy Control Function, PCF, 6
Session Management Function, SMF, 9
Unified Data Repository, UDR, 2
User Plane Function, UPF, 10
Application Function, AF, 5
Network Data Analytics Function, NWDAF, 4
Charging Function, CHF, 7.

A functional description of these network functions is specified in clause 6 of the Third Generation Partnership Project, 3GPP, standard 23.501, "System Architecture for the 5G system", the contents of which are included herein by reference.

Figure 2:
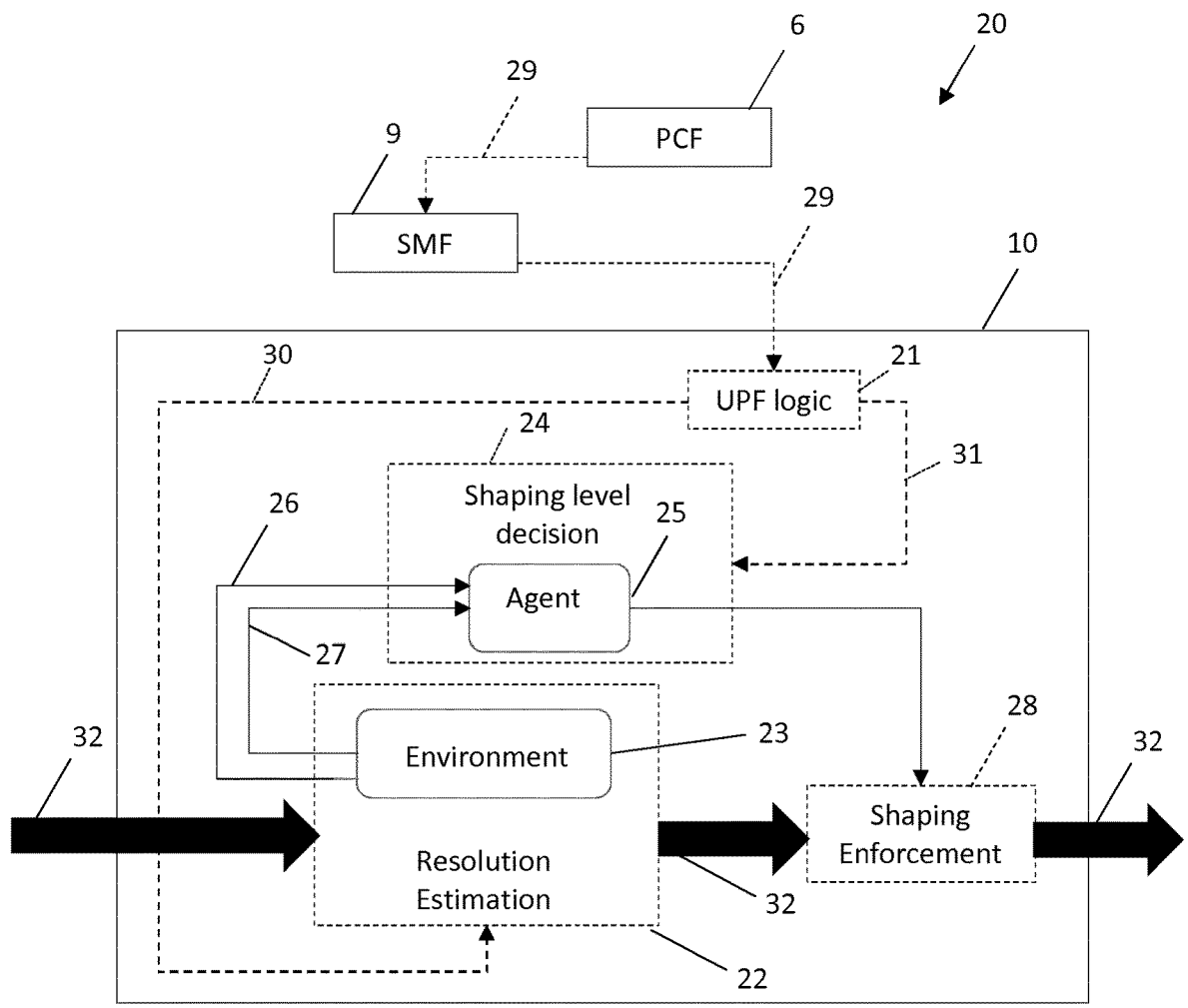
FIG. 2 schematically illustrates an Adaptive Bit Rate, ABR, solution according to the present disclosure.

FIG. 2 schematically illustrates an Adaptive Bit Rate, ABR, solution 20 according to the present disclosure. Here, the network nodes PCF 6, SMF 9 and UPF 10 are shown, and how these nodes collaborate with each other to achieve a desired result according to the present disclosure. The traditionally known functions and services offered by the UPF 10 are implemented by the UPF logic 21. This may be a physical or logical entity. The UPF 10 further comprises a shaping level decision module 24, a resolution estimation module 22 and a shaping enforcement module 28. The person skilled in the art appreciates that these entities may either be physical or logical entities implemented within the UPF 10.

A Reinforcement Learning Agent, RLA, 25 collocated in the shaping level decision module 24 takes decisions on the shaping level to apply to a video session 32. The resolution estimation module 22 acts as the Reinforcement Learning, RL, environment 23, sending to the shaping level decision module 24 the corresponding states 26 and rewards 27. The required or wanted resolution 29 is provided by PCF 6 on a per user and per video application basis. The wanted resolution 29 reaches UPF 10 via SMF 9 upon PDU session establishment.

The wanted resolution 29 is conveyed 30 to the resolution estimation module 22 so that it can be used as an input to compute the reward. But the reward may also be computed as a function of many other parameters. The wanted resolution 29 is conveyed 31 to the shaping level decision module 24, so that it may be used as input to determine the shaping level space i.e. the set of shaping levels to choose from the so-called action space.

The resolution estimation module 22 processes video chunks from the video traffic 32 and tries to estimate the video resolution. For each processed video chunk, the resolution estimation module 22 sends to the shaping level decision module 24 the determined resolution state 26, for example, an estimated video resolution or "unestimated resolution" state, and the associated reward 27, for example computed based on the estimated resolution and the wanted resolution.

The RLA 25 in the shaping level decision module 24 takes the shaping level decisions based on the wanted resolution, the received state, the received reward, the set of possible actions, whether it's on exploration or exploitation mode, the learned policies, etc. and provides the decision to the shaping enforcement module 28.

Figure 3:
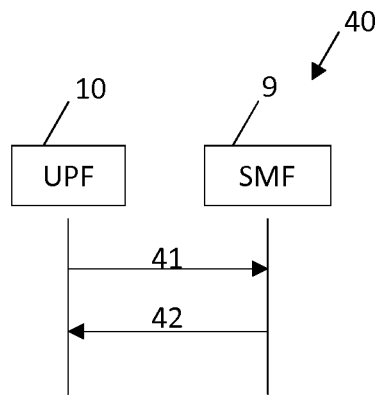
FIG. 3 schematically illustrates part of a method according to the present disclosure.

In FIG. 3, method 40 schematically illustrates an association procedure between the UPF 10 and the SMF 9. When the UPF 10 is deployed in the network, it first needs to associate to a SMF 9. To that extent the UPF 10 sends to SMF 9 a PFCP Association Setup Request message 41 including the User Plane, UP, function features it supports. It also includes the indication of a new feature: the support of the Reinforcement Learning, RL, based Adaptive Bit Rate, ABR, shaping.

In turn the SMF 9 replies to the association request 41 with a PFCP Association Setup Response message 42 including the Control Plane, CP, function features it supports. It also includes the indication of a new feature: the support of the Reinforcement Learning based ABR shaping.

It may be noted that step 41 may be triggered by the UPF 10 or the SMF 9. In case it is triggered by SMF 9, the SMF 9 sends the association request message to UPF 10 including the CP features and the response the UP features.

Figure 4:
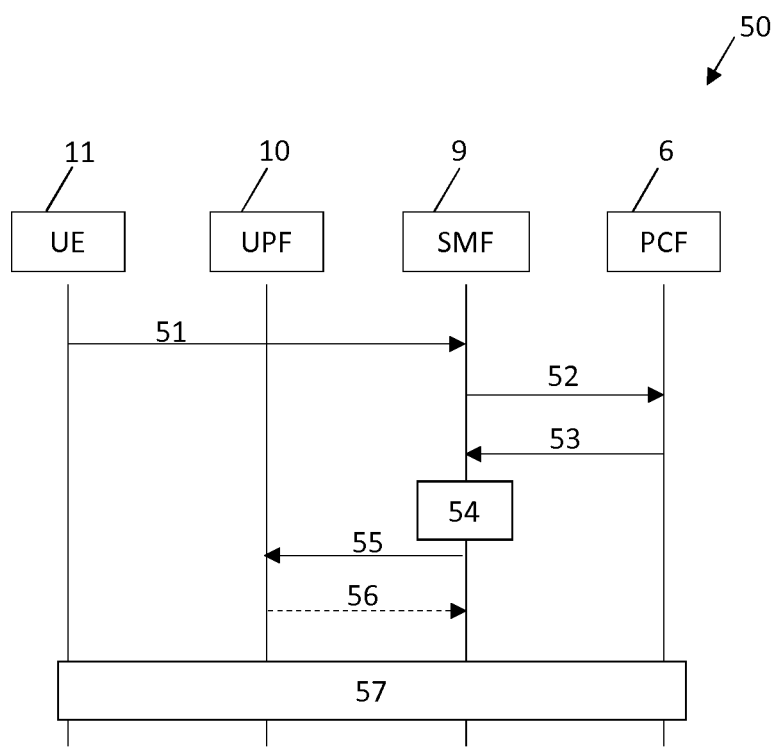
FIG. 4 schematically illustrates part of a method according to the present disclosure.

In FIG. 4, method 50 depicts the PDU session establishment procedure. The UE 11 sends a PDU session establishment request message to AMF (not shown), and AMF relays 51 it to SMF 9. The message may include the User-ID. The SMF 9 queries 52 the PCF 6 to get the policy rules, wherein the query message may include the User-ID as a parameter.

The PCF 6 responds 53 to SMF 9 with the policy rules for that specific user. The policy rules include a wanted resolution and a Maximum Bit Rate, MBR, along with the corresponding video Application-ID, for example App-ID=YouTube™. The wanted resolution is a categorical value, e.g. high/medium/low, or 240p/480p/1080p, . . . , etc.

When SMF 9 receives the wanted resolution in a PCC rule it knows this relates to the RL based ABR shaping feature in the UPF 10, accordingly SMF 9 selects 54 a UPF 10 supporting this feature for the user. The SMF 9 sends 55 to UPF 10 a PFCP Session Establishment Request message comprising A Packet Detection Rule, PDR, indicating the packet matching rules and a Quality of Service Enforcement Rule, QER, including the wanted resolution and Maximum Bit Rate, MBR. It may be understood, by the skilled person, that a message for the update or modification of a session—i.e. session establishment modification—is equivalent to this step.

The UPF 10 sends a PFCP Session Establishment Response message 56 back to SMF 9. The PDU session establishment procedure is completed 57.

Figure 5:
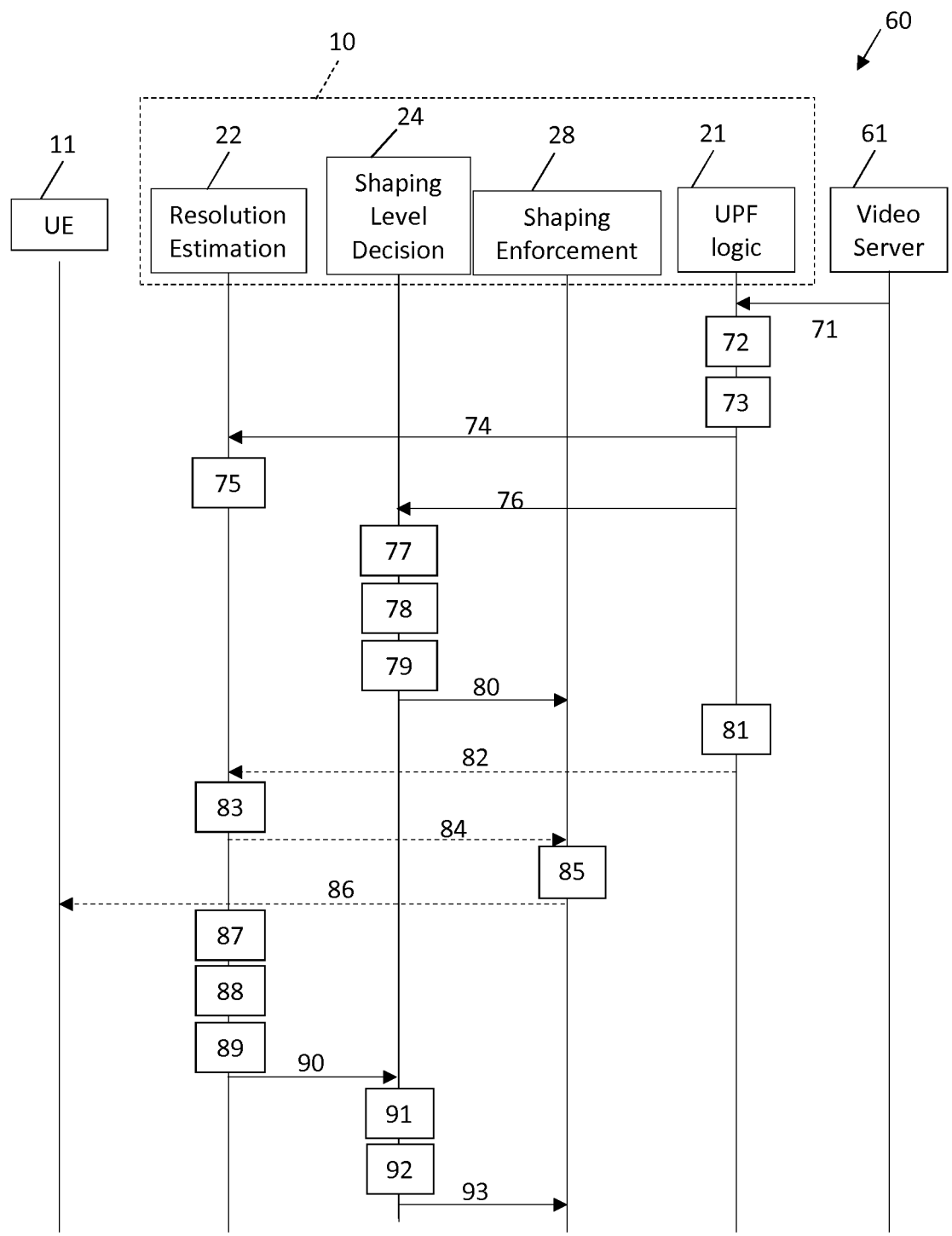
FIG. 5 schematically illustrates a method according to the present disclosure.

FIG. 5 schematically depicts the procedures and reinforcement learning mechanisms that take place for each video session. In a first step of the method 60, video traffic is sent 71 from the video server 61 towards the UE 11. The video traffic reaches UPF 10.

The video packets match 72 a PDR associated to a QER that contains the wanted resolution and MBR. UPF 10 recognizes then that this traffic belongs to a video application that uses the RL-based ABR shaping feature. If the packet is the first packet of the video session, steps 73-80 take place.

UPF 10 generates 73 a video session Identifier, ID, for the video session. Then it stores the video session-ID—IP 5 tuple mapping to be able to derive the video-session-ID for subsequent packets. The video session-ID and wanted resolution are conveyed 74 to the resolution estimation module 22. In a step 75, the resolution estimation module 22 configures the state and reward computation algorithms for the Video session-ID and wanted resolution. It will be understood by the skilled person that multiple algorithms may be used and what specific algorithms the resolution estimation module 22 uses is implementation-specific and is not within the scope of the present disclosure.

The video-session-ID, wanted resolution, and MBR are conveyed 76 to the shaping level decision module 24. If multiple separate RLAs are used for each different wanted resolution, for example, the shaping level decision module 24 selects 77 the corresponding RLA and stores the video session-ID RLA mapping to find what RLA handles a certain video session-ID. The RLA configures 78 the shaping level space based on the wanted resolution and MBR for the video session-ID.

The shaping level space is the set of different shaping levels that can be chosen for the video session-ID, i.e. the so-called action space in reinforcement learning. The shaping level space is derived based on the wanted resolution and MBR. As an example, the step between shaping levels can be higher if the wanted resolution is very high, and lower if the wanted resolution is low. And, of course, there may not be a shaping level bigger than the MBR. It may be understood that the specific algorithms that may be used to derive the shaping level space is an implementation aspect, and does not belong to the scope of the present disclosure.

In step 89, the RLA decides the shaping level based on the wanted resolution, the set of possible actions—i.e. the shaping level action space, and based on whether it is on exploration or exploitation mode, the learned policies, etc. The shaping level decision module 24 sends 80 to the shaping enforcement module 28, the video session-ID and the decided shaping level.

The UPF 10 takes the video session-ID corresponding to the video session and adds 81 it as metadata in the video traffic. The video traffic with the video session-ID as metadata is sent 82 to the resolution estimation module 22. The resolution estimation module 22 analyzes 83 the video packets, extracts the relevant parameters, and may also classify the packets into categories, for example by using Machine Learning mechanisms, and then stores all the extracted information before forwarding or transferring the packet to the destination, i.e. a UE or client server, or the like.

The video traffic with the video session-ID as metadata is sent 84 to the shaping enforcement module 28. The shaping enforcement module 28 enforces 85 the corresponding shaping level bit rate to the video session. It also removes the video session-ID metadata before forwarding 86 the packets towards the UE 11.

The video traffic sent from the UPF 10 reaches the video application in the UE 11. After analyzing and forwarding out the video packets in steps 83, 84, the resolution estimation module 22 checks 87 whether a video chunk has been fully transmitted. If the resolution estimation module detects that a video chunk has been fully transmitted, the following steps 88-93 take place, else the process ends here with step 87.

The resolution estimation module 22 estimates 88 the resolution of the video chunk and based on the estimated resolution, the resolution estimation module 22 determines 88 the state and computes the reward.

As the simplest approach, the state can be the estimated resolution itself, and the reward can be computed as the difference between the estimated resolution and wanted resolution. But more complex computation models may be used, considering other parameters such as previous estimated resolutions, the current video session throughput, and other parameters extracted in the packet analysis.

The reward may be also computed using other UPF information, for example, by considering the overall network load status, wherein a congested network would mean a low reward, transmission parameters, etc., and/or the real-time user's QoE estimation if available in the UPF by means of analytics processes, wherein a low QoE would mean a low reward.

The resolution estimation module 22 sends 90 to the shaping level decision module 24, the video-session-ID, the state and the computed reward. Based on the received state and reward, the RLA learns 91 the effect of the past shaping level decisions. The learning phase basically means that the RLA learns how to map the states to the actions in an optimal way, usually by trying to maximize the reward of the actions.

In a step 92, the RLA in the shaping level decision module 24 decides the shaping level based on the received state and reward, the wanted resolution, the set of possible actions—i.e. the shaping level action space, whether it is on exploration or exploitation mode, the learned policies, etc.

The shaping level decision module 24 sends 93 to the shaping enforcement module 28 the video session-ID and the decided shaping level. Then this shaping level is applied for the subsequent traffic of the video session.

When it comes to the exploration and exploitation phases of the RLA, it is important to highlight that the exploration phase can take place in a controlled environment, for example in a laboratory, and not in a production environment. Other possibility is to use existing production data to pre-train the RLA. The RLA can be deployed in the production environment already trained to avoid an initial extensive exploration phase in production, which may not be desirable.

Other variations to the disclosed examples can be understood and effected by those skilled in the art of practicing the claimed disclosure, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The present disclosure is not limited to the examples as disclosed above, can be modified and enhanced by those skilled in the art beyond the scope of the present disclosure as disclosed in the appended claims without having to apply inventive skills.

The invention claimed is:

1. A method of supporting Adaptive Bit Rate, ABR, video resolution shaping of a video data stream of a video session transferred by a User Plane Function, UPF, in a Service Based Architecture, SBA, domain deployed in a telecommunications system, the UPF being a network node, the method comprising:
   determining, by the UPF, a video resolution of a video data stream received by the UPF by computing a video resolution state of a video chunk of the received video data stream in which the video resolution state is an estimated resolution of the video chunk;
   establishing, by the UPF, based on the determined video resolution, a required video resolution and a Maximum Bit Rate, MBR, of the video session, a video resolution shaping level to be applied at the received video data stream, for achieving the required video resolution of said the video session;
   applying, by the UPF, the video resolution shaping on the received video data stream;
   transferring, by the UPF to a client device, the received video data stream at which the video resolution shaping is applied;
   establishing the video resolution shaping level being performed by the UPF implementing a Reinforcement Learning Agent, RLA, operating with an observation space comprising the determined video resolution, a reward space comprising a reward based on the computed video resolution state and the required video resolution, the reward being computed, by the UPF, additionally based on overall network load; and
   an action space comprising video resolution shaping levels to be applied at the received video data stream, the video resolution shaping level comprising a bit rate of the video data stream to be transferred by the UPF to the client device, and the video resolution shaping level being applied, by the RLA selecting a video resolution shaping level from the action space based on the video resolution state, the reward, a level of operation of the RLA, and the MBR of the video session.

2. The method according to claim 1, wherein the reward is computed, by the UPF, additionally based on at least one of an estimation of Quality of Experience, QoE, of the video session, video session throughput at the UPF, estimated resolutions of previous video chunks, and network transmission parameters.

3. A User Plane Function, UPF, in a Service Based Architecture, SBA, domain deployed in a telecommunications system, the UPF being a network node, the UPF implementing a Reinforcement Learning Agent, RLA, operating with an observation space, a reward space, and an action space comprising video resolution shaping levels to be applied at a received video data stream supporting Adaptive Bit Rate, ABR, video resolution shaping of a video data stream of a video session to be transferred by the UPF, the UPF being configured to:
   determine, by the UPF, a video resolution of a video data stream received by the UPF by computing a video resolution state of a video chunk of the received video data stream in which the video resolution state is an estimated resolution of the video chunk;
   establish, by the UPF, based on the determined video resolution, a required video resolution and a Maximum Bit Rate, MBR, of the video session, a video resolution shaping level to be applied at the received video data stream, for achieving the required video resolution of the video session;
   apply, by the UPF, the video resolution shaping on the received video data stream;
   transfer, by the UPF to a client device, the received video data stream at which the video resolution shaping is applied;
   establishing the video resolution shaping level being performed by the UPF implementing a Reinforcement Learning Agent, RLA, operating with an observation space comprising the determined video resolution, a reward space comprising a reward based on the computed video resolution state and the required video resolution, the reward being computed, by the UPF, additionally based on overall network load; and
   an action space comprising video resolution shaping levels to be applied at the received video data stream, the video resolution shaping level comprising a bit rate of the video data stream to be transferred by the UPF to the client device, and the video resolution shaping level being applied, by the RLA selecting a video resolution shaping level from the action space based on the video resolution state, the reward, a level of operation of the RLA, and the MBR of the video session.

4. The UPF according to claim 3, wherein the reward is computed, by the UPF, additionally based on at least one of, an estimation of Quality of Experience, QoE, of the video session, video session throughput at the UPF, estimated resolutions of previous video chunks, and network transmission parameters.

* * * * *